United States Patent
Chung et al.

(10) Patent No.: US 9,127,157 B2
(45) Date of Patent: Sep. 8, 2015

(54) FLAME-RETARDANT AND SCRATCH-RESISTANT POLYCARBONATE RESIN COMPOSITION

(71) Applicant: Cheil Industries Inc., Gumi-si (KR)

(72) Inventors: Jin Hwa Chung, Uiwang-si (KR); Kee Hae Kwon, Uiwang-si (KR); Jin Seong Lee, Uiwang-si (KR); Man Suk Kim, Uiwang-si (KR); Yong Hee Kang, Uiwang-si (KR); Kwang Soo Park, Uiwang-si (KR); Ja Kwan Koo, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 139 days.

(21) Appl. No.: 13/872,230

(22) Filed: Apr. 29, 2013

(65) Prior Publication Data

US 2013/0237650 A1 Sep. 12, 2013

Related U.S. Application Data

(63) Continuation-in-part of application No. PCT/KR2010/009533, filed on Dec. 29, 2010.

(30) Foreign Application Priority Data

Nov. 5, 2010 (KR) ........................ 10-2010-0109988

(51) Int. Cl.
  C08L 69/00 (2006.01)
  C08L 43/02 (2006.01)
  C08L 33/12 (2006.01)
  C08F 220/14 (2006.01)

(52) U.S. Cl.
  CPC ............... *C08L 69/00* (2013.01); *C08F 220/14* (2013.01)

(58) Field of Classification Search
  None
  See application file for complete search history.

(56) References Cited

U.S. PATENT DOCUMENTS

| | | | |
|---|---|---|---|
| 3,030,347 A | 4/1962 | O'Brien et al. | |
| 3,210,326 A * | 10/1965 | Tousignant et al. | 526/292.5 |
| 3,932,321 A | 1/1976 | Maki et al. | |
| 3,985,831 A | 10/1976 | Boyer | |
| 4,409,350 A | 10/1983 | Fujiwara et al. | |
| 5,278,009 A | 1/1994 | Iida et al. | |
| 5,292,817 A | 3/1994 | Grey et al. | |
| 5,663,019 A | 9/1997 | Matsumura et al. | |
| 5,773,533 A | 6/1998 | Horold | |
| 5,827,626 A | 10/1998 | Kobayashi et al. | |
| 5,876,895 A | 3/1999 | Hishiro et al. | |
| 5,998,091 A | 12/1999 | Suzuki | |
| 6,096,852 A | 8/2000 | Lensvelt et al. | |
| 6,624,250 B2 | 9/2003 | Zimmerman | |
| 6,632,891 B1 | 10/2003 | Tada et al. | |
| 7,763,402 B2 | 7/2010 | Cho et al. | |
| 7,863,382 B2 | 1/2011 | Ishii et al. | |
| 8,293,149 B2 | 10/2012 | Lee et al. | |
| 8,486,591 B2 | 7/2013 | Jeong et al. | |
| 2002/0172873 A1 | 11/2002 | Ueda et al. | |
| 2007/0145338 A1 | 6/2007 | Zakikhani | |
| 2008/0242795 A1 | 10/2008 | Jang et al. | |
| 2010/0152357 A1 | 6/2010 | Kwon et al. | |
| 2010/0160474 A1 | 6/2010 | Lee et al. | |
| 2010/0168272 A1 * | 7/2010 | Park et al. | 523/122 |
| 2010/0240831 A1 | 9/2010 | Kim et al. | |
| 2010/0256288 A1 | 10/2010 | Kim et al. | |
| 2011/0009524 A1 | 1/2011 | Kwon et al. | |
| 2011/0160400 A1 | 6/2011 | Lee et al. | |
| 2012/0115761 A1 | 5/2012 | Basu | |
| 2013/0001483 A1 | 1/2013 | Lee et al. | |
| 2013/0234084 A1 | 9/2013 | Chung et al. | |

FOREIGN PATENT DOCUMENTS

| | | |
|---|---|---|
| CN | 1121083 A | 4/1996 |
| CN | 101464631 A | 6/2009 |
| CN | 101497630 A | 8/2009 |
| CN | 101747610 A | 6/2010 |
| CN | 101805567 A | 8/2010 |
| EP | 0319971 A2 | 6/1989 |
| EP | 0628599 A1 | 12/1994 |
| EP | 0663410 A1 | 7/1995 |
| EP | 0725315 A2 | 8/1996 |
| EP | 1739109 A1 | 1/2007 |
| EP | 2657292 A | 10/2013 |
| JP | 02-70712 A | 3/1990 |
| JP | 07-140654 A | 6/1995 |
| JP | 08-262707 A | 10/1996 |
| JP | 10-254133 A | 9/1998 |
| JP | 11-092964 A | 4/1999 |
| JP | 2000-075501 A | 3/2000 |
| JP | 2000-305262 A | 11/2000 |
| JP | 2002-244287 A | 8/2002 |
| JP | 2006-257126 A | 9/2006 |
| JP | 2008-298938 A | 12/2008 |
| JP | 2009-091458 A | 4/2009 |

(Continued)

OTHER PUBLICATIONS

Notice of Allowance in commonly owned U.S. Appl. No. 13/190,979 mailed on Jun. 19, 2012, pp. 1-10.
Office Action in commonly owned U.S. Appl. No. 13/353,710 mailed on Feb. 1, 2013, pp. 1-24.
Office Action in commonly owned U.S. Appl. No. 13/190,979 mailed on Feb. 16, 2012, pp. 1-10.
UL IDES Properties for PMMA, http://plastics.ides.com/generics/3/c/t/acrylic-acrylic-properties-processing, downloaded on Dec. 19, 2012, pp. 1-4.
Notice of Allowance in commonly owned U.S. Appl. No. 13/353,710 mailed on Aug. 14, 2014, pp. 1-14.
Search Report in commonly owned Chinese Application No. 201210007804.5 dated Dec. 1, 2013, pp. 1-4.

(Continued)

*Primary Examiner* — David Buttner
(74) *Attorney, Agent, or Firm* — Additon, Higgins & Pendleton, P.A.

(57) ABSTRACT

The present invention provides a flame-retardant and scratch-resistant polycarbonate resin composition including a (meth)acrylic flame-retardant copolymer.

18 Claims, No Drawings

(56) References Cited

FOREIGN PATENT DOCUMENTS

| | | |
|---|---|---|
| KR | 10-1980-0001251 B1 | 10/1980 |
| KR | 10-1992-7002502 | 9/1992 |
| KR | 10-1993-7000858 | 3/1993 |
| KR | 10-1994-0005617 | 6/1994 |
| KR | 10-1995-7000359 | 1/1995 |
| KR | 10-1995-0011163 B1 | 9/1995 |
| KR | 10-1995-7003746 | 9/1995 |
| KR | 10-2001-0052338 A | 6/2001 |
| KR | 10-2006-0111178 | 10/2006 |
| KR | 10-0817563 B1 | 3/2008 |
| KR | 10-0832518 B1 | 5/2008 |
| KR | 10-2008-0089122 A | 10/2008 |
| KR | 10-0885819 B1 | 2/2009 |
| KR | 10-2009-0024561 A | 3/2009 |
| KR | 10-2009-0038191 A | 4/2009 |
| KR | 10-2009-0066204 A | 6/2009 |
| KR | 10-2009-0066242 A | 6/2009 |
| KR | 10-2010-0049458 A | 5/2010 |
| KR | 10-2010-0098882 A | 9/2010 |
| KR | 10-2011-0077881 A | 7/2011 |
| KR | 10-2011-0078238 A | 7/2011 |
| TW | 406214 B | 9/2000 |
| TW | 200916955 A | 4/2009 |
| TW | 201030461 A | 8/2010 |
| WO | 99/58593 A1 | 11/1999 |
| WO | 2008/120854 A1 | 10/2008 |
| WO | WO-2009/078593 * | 6/2009 |
| WO | 2009/116722 A1 | 9/2009 |
| WO | 2012/015128 A1 | 2/2012 |
| WO | 2012/060514 A1 | 5/2012 |
| WO | 2012/060515 A1 | 5/2012 |
| WO | 2012/081761 A1 | 6/2012 |

OTHER PUBLICATIONS

Canniccioni et al., "Polymerization of a Phosphonated Methacrylate via a Raft Living Radical Polymerization," Polymer Preprints, American Chemical Society, Division of Polymer Chemistry, 2001, 52(2), 645-646.

Office Action in commonly owned U.S. Appl. No. 13/353,710 mailed on Apr. 28, 2014, pp. 1-15.

Notice of Allowance in commonly owned U.S. Appl. No. 13/353,710 mailed on Sep. 5, 2013, pp. 1-12.

Final Office Action in commonly owned U.S. Appl. No. 13/353,710 mailed on May 17, 2013, pp. 1-14.

Office Action in commonly owned U.S. Appl. No. 12/966,133 mailed on Jan. 3, 2013, pp. 1-20.

Final Office Action in commonly owned U.S. Appl. No. 12/966,133 mailed on Jun. 28, 2013, pp. 1-23.

International Search Report in counterpart International Application No. PCT/KR2010/009539 dated Jan. 18, 2012, pp. 1-6.

Price, D. et al. "Ignition Temperatures and Pyrolysis of a Flame Retardant Methyl Methacrylate Copolymer Containing Diethyl(methacryloxymethyl)phosphonate Units." In: Polym. Int., 2000, vol. 49, pp. 1164-1168.

Extended European Search Report in commonly owned European Application No. 10855400 dated Nov. 15, 2013, pp. 1-6.

International Search Report in commonly owned International Application No. PCT/KR2010/009538 dated Sep. 16, 2011, pp. 1-4.

Notice of Allowance in commonly owned U.S. Appl. No. 13/872,240 mailed Aug. 20, 2014, pp. 1-9.

Price et al., "Flame retarding poly(methyl methacrylate) with phosphorous-containing compounds: comparison of an additive with a reactive approach", Polymer Degradation and Stability, 2001, vol. 74, pp. 441-447.

Ebdon et al., "Thermal degradation and flame retardance in copolymers of methyl methacrylate with diethyl (methacryloyloxymethyl) phosphonate", Polymer Degradation and Stability, Barking, GB, vol. 70, No. 3, Jan. 1, 2000, pp. 425-436.

Office Action in commonly owned U.S. Appl. No. 13/740,335 mailed Sep. 18, 2014, pp. 1-20.

Office Action in commonly owned U.S. Appl. No. 13/872,240 mailed Feb. 24, 2014, pp. 1-8.

Office Action in commonly owned U.S. Appl. No. 13/914,856 mailed Oct. 14, 2014, pp. 1-10.

Chinese Office Action in counterpart Chinese Application No. 201080070004.7 dated Feb. 19, 2014, pp. 1-7.

English-translation of Chinese Office Action in counterpart Chinese Application No. 201080070004.7 dated Feb. 19, 2014, pp. 1-7.

Hong et al., "Preparation and Properties of Flame Retardant Acrylate Rubber," China Synthetic Rubber Industry, vol. 23, No. 02, pp. 92-94.

Jin et al., "Polyacrylates Flame Retardants," Chinese Journal of Colloid & polymer, vol. 19, No. 4, pp. 41-43, 2001.

Price et al., "Flame retardance of poly(methyl methacrylate) modified with phosphorus-containing compounds", Polymer Degradation and Stability, vol. 77, (2002) pp. 227-233.

Office Action in commonly owned U.S. Appl. No. 13/740,335 mailed Jan. 7, 2015, pp. 1-12.

Final Office Action in commonly owned U.S. Appl. No. 13/740,335 mailed Mar. 12, 2015, pp. 1-12.

Final Office Action in commonly owned U.S. Appl. No. 13/914,856 mailed Mar. 19, 2015, pp. 1-10.

* cited by examiner

FLAME-RETARDANT AND SCRATCH-RESISTANT POLYCARBONATE RESIN COMPOSITION

CROSS-REFERENCE TO RELATED APPLICATIONS

This application is a continuation-in-part of International Application No. PCT/KR2010/009533 filed on Dec. 29, 2010, pending, which designates the U.S., published as WO 2012/060515, and is incorporated herein by reference in its entirety, and claims priority therefrom under 35 USC Section 120. This application also claims priority under 35 USC Section 119 to and the benefit of Korean Patent Application No. 10-2010-0109988 fled on Nov. 5, 2010, the entire disclosure of which is incorporated herein by reference.

FIELD OF THE INVENTION

The present invention relates to a flame retardant and scratch resistant polycarbonate resin composition.

BACKGROUND OF THE INVENTION

Thermoplastic resins can exhibit excellent physical properties such as low specific gravity, good moldability and good impact resistance, as compared with glass or metal. With the trend of low cost, larger and light weight electric and electronic products, plastic products made of thermoplastic resins are quickly replacing existing glass or metal-based products, thereby broadening applications thereof from electric and electronic products to automobile components. In line with this trend, functions as exterior materials and external appearance are increasingly important. In addition, there is a strong need for resins having good scratch resistance for ensuring stability from exterior shock or scratch or flame retardancy for ensuring stability against fire.

Polycarbonate resins among thermoplastic resins exhibit not only excellent mechanical strength, flame retardancy, transparency and weather resistance, but also good impact resistance, thermal stability, self extinguishability, dimensional stability and the like, and thus have been widely applied to electric and electronic products and automobile components. In addition, polycarbonate resins can replace glass in products such as lenses where both transparency and impact resistance are required. However, polycarbonate resins have a disadvantage in that they exhibit very poor scratch resistance.

Meanwhile, acrylic resins, specifically polymethyl methacrylate (PMMA) resins, have excellent transparency, weather resistance, mechanical strength, surface gloss, adhesion, and the like, in particular, remarkably excellent scratch resistance. However, acrylic resins have drawbacks in that impact resistance and flame retardancy are very poor.

In order to overcome these problems, one method is to prepare a polycarbonate (PC)/PMMA resin by mixing polycarbonate (PC) and acrylic resins, for example polymethyl methacrylate (PMMA). In PC/PMMA mixed resins, a (meth)acrylic copolymer having a high index of refraction is employed to prepare an alloy resin of polycarbonate and (meth)acrylic resins having high flame retardancy and scratch resistance, thereby improving compatibility. However, due to a low content of flame retardant in the alloy resin of polycarbonate and (meth)acrylic resin, the alloy resin can exhibit almost no flame retardancy and is likely to suffer from deterioration in mechanical properties when containing a flame retardant. Furthermore, when preparing a resin by adding a phosphorus monomer flame retardant, the monomer can escape from the resin, which can cause environmental contamination.

SUMMARY OF THE INVENTION

The present invention provides a polycarbonate resin composition that can have flame retardancy together with scratch resistance. The polycarbonate resin composition can be environmentally friendly and can have excellent physical properties including flame retardancy, scratch resistance, and/or heat resistance.

The polycarbonate resin composition may include (A) a polycarbonate resin; (B) a (meth)acrylic flame retardant copolymer; and (C) a (meth)acrylic copolymer having an index of refraction (or refractive index) of about 1.495 to about 1.590.

In one embodiment, the (B) (meth)acrylic flame retardant copolymer may include: (b1) a phosphorus-based (meth)acrylic monomer represented by Formula 1; (b2) an aromatic (meth)acrylate and/or cycloaliphatic (meth)acrylate represented by Formula 2 and/or 3; and (b3) a reactive unsaturated monomer:

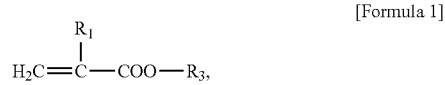

[Formula 1]

wherein $R_1$ is —H or —$(CH_2)n$-$CH_3$, n is an integer from 0 to 5, and $R_3$ is

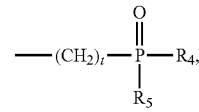

wherein t is an integer from 1 to 10, $R_4$ and $R_5$ are the same or different and are each independently —$O(CH_2)_qX$, q is an integer from 0 to 3, and X is methyl, cyclohexyl, phenyl, methylphenyl, methylethylphenyl, propylphenyl, methoxyphenyl, cyclohexylphenyl, chlorophenyl, bromophenyl, phenylphenyl or benzylphenyl,

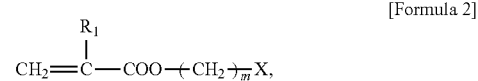

[Formula 2]

wherein $R_1$ is —H or —$(CH_2)n$-$CH_3$, n is an integer from 0 to 5, m is an integer from 0 to 10, and X is cyclohexyl, phenyl, methylphenyl, methylethylphenyl, methoxyphenyl, propylphenyl, cyclohexylphenyl, chlorophenyl, bromophenyl, phenylphenyl or benzylphenyl,

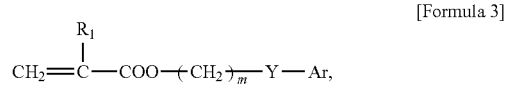

[Formula 3]

wherein $R_1$ is —H or —$(CH_2)n$-$CH_3$, n is an integer from 0 to 5, m is an integer from 0 to 10, Y is oxygen or sulfur, and Ar is cyclohexyl, phenyl, methylphenyl, methylethylphenyl, methoxyphenyl, cyclohexylphenyl, chlorophenyl, bromophenyl, phenylphenyl or benzylphenyl.

In one embodiment, the (B) (meth)acrylic flame retardant copolymer may have a weight average molecular weight from about 5,000 g/mol to about 500,000 g/mol.

In one embodiment, the (B) (meth)acrylic flame retardant copolymer may be present in an amount of about 1 part by weight to about 50 parts by weight based on about 100 parts by weight of the polycarbonate resin composition.

In one embodiment, the composition may further include at (D) a rubber-modified vinyl graft copolymer resin and/or (E) a phosphorus-based flame retardant.

In one embodiment, the polycarbonate resin composition may have a flame retardancy of V2 or more, as measured on a 3.2 mm thick specimen in accordance with UL94.

In one embodiment, the polycarbonate resin composition may have a scratch resistance width of from about 180 μm to about 340 μm, as measured on a 2.5 mm thick specimen in accordance with a Ball-type Scratch Profile (BSP) test.

In one embodiment, the polycarbonate resin composition may have a degree of heat resistance (Vicat Softening Temperature: VST) of about 80° C. or more, as measured on a 3.2 mm thick specimen under a load of 5 kg in accordance with ASTM D1525.

The polycarbonate resin composition may have both improved flame retardancy and scratch resistance. The present invention further provides an environmentally friendly polycarbonate resin composition that can have excellent flame retardancy and scratch resistance. Furthermore, the present invention provides a polycarbonate resin composition that can have excellent physical properties including flame retardancy and scratch resistance together with heat resistance.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to the present invention, a polycarbonate resin composition may include (A) a polycarbonate resin; (B) a (meth)acrylic flame retardant copolymer; and (C) a (meth)acrylic copolymer having an index of refraction of about 1.495 to about 1.590.

(A) Polycarbonate Resin

Examples of the polycarbonate resin may include without limitation linear polycarbonate resins, branched polycarbonate resins, polyester carbonate copolymer resins, and the like, and combinations thereof.

The linear polycarbonate resins may be prepared by a conventional method, in which one or more phenol compounds, for example a dihydric phenol compound, is reacted with phosgene in the presence of a molecular weight modifying agent and a catalyst. In addition, the linear polycarbonate resins may include resins prepared through transesterification of a phenol compound, for example a dihydric phenol compound, and a carbonate precursor, for example diphenyl carbonate.

The branched polycarbonate resins may be prepared by reacting a polyfunctional aromatic compound such as trimellitic anhydride, trimellitic acid, and the like with a dihydric phenol compound and a carbonate precursor, without being limited thereto.

The polyester carbonate copolymer resins may be prepared by reacting a difunctional carboxylic acid with a dihydric phenol compound and a carbonate precursor, without being limited thereto.

The dihydric phenol compound may include bisphenol compounds. For example, the dihydric phenol compound may be 2,2-bis(4-hydroxyphenyl)propane (bisphenol A). The bisphenol A may be partially or completely replaced with a different type of dihydric phenol compound.

Examples of different types of dihydric phenol compounds may include without limitation hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, halogenated bisphenols, and the like, and combinations thereof, for example 2,2-bis(3,5-dibromo-4-hydroxyphenyl)propane.

In addition, the polycarbonate resin may be a homopolymer including a dihydric phenol compound, a copolymer including two or more dihydric phenol compounds, or a mixture thereof.

According to the present invention, the polycarbonate resin composition may include the polycarbonate resin in an amount of about 10 parts by weight to about 98 parts by weight, for example about 50 parts by weight to about 90 parts by weight, based on about 100 parts by weight of the polycarbonate resin composition. In some embodiments, the polycarbonate resin composition may include the polycarbonate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 parts by weight. Further, according to some embodiments of the present invention, the amount of the polycarbonate resin can be in a range from about any of the foregoing amounts to about any other of the foregoing amounts.

When the polycarbonate resin composition includes the polycarbonate resin in an amount within this range, the mechanical properties and scratch resistance of the polycarbonate can be improved.

(B) (Meth)Acrylic Flame Retardant Copolymer

The (meth)acrylic flame retardant copolymer may be a copolymer prepared by polymerizing (b1) a phosphorus-based (meth)acrylic monomer represented by Formula 1; (b2) an aromatic and/or cycloaliphatic (meth)acrylate represented by Formula 2 and/or 3; and (b3) a reactive unsaturated monomer:

[Formula 1]

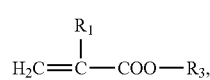

wherein $R_1$ is —H or —$(CH_2)n$-$CH_3$, n is an integer from 0 to 5, and $R_3$ is

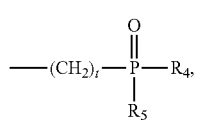

wherein t is an integer from 1 to 10, $R_4$ and $R_5$ are the same or different and are each independently $-O(CH_2)_qX$, q is an integer from 0 to 3, and X is methyl, cyclohexyl, phenyl, methylphenyl, methylethylphenyl, propylphenyl, methoxyphenyl, cyclohexylphenyl, chlorophenyl, bromophenyl, phenylphenyl or benzylphenyl,

[Formula 2]

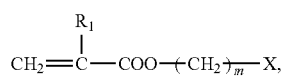

wherein $R_1$ is $-H$ or $-(CH_2)n-CH_3$, n is an integer from 0 to 5, m is an integer from 0 to 10, and X is cyclohexyl, phenyl, methylphenyl, methylethylphenyl, methoxyphenyl, propylphenyl, cyclohexylphenyl, chlorophenyl, bromophenyl, phenylphenyl or benzylphenyl.

[Formula 3]

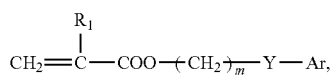

wherein $R_1$ is $-H$ or $-(CH_2)n-CH_3$, n is an integer from 0 to 5, m is an integer from 0 to 10, Y is oxygen or sulfur, and Ar is cyclohexyl, phenyl, methylphenyl, methylethylphenyl, methoxyphenyl, cyclohexylphenyl, chlorophenyl, bromophenyl, phenylphenyl or benzylphenyl.

The (b1) phosphorus-based (meth)acrylic monomer may have an index of refraction of about 1.4000 to about 1.6000.

The (meth)acrylic flame retardant copolymer may include the (b1) phosphorus-based (meth)acrylic monomer in an amount of about 1 wt % or more, for example about 1 wt % to about 50 wt %, for example about 5 wt % to about 50 wt %, based on the total weight (100 wt %) of the (meth)acrylic flame retardant copolymer. In some embodiments, the (meth) acrylic flame retardant copolymer may include the (b1) phosphorus-based (meth)acrylic monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the (b1) phosphorus-based (meth) acrylic monomer can be in a range from about any of the foregoing amounts to about any other of the foregoing amounts.

When the (meth)acrylic flame retardant copolymer includes the (b1) phosphorus-based (meth)acrylic monomer in an amount within this range, the resin composition can exhibit excellent flame retardancy and scratch resistance.

Examples of the (b1) phosphorus-based (meth)acrylic monomer may include without limitation dimethyl(methacryloyloxymethyl)phosphonate, dimethyl(acryloyloxymethyl)phosphonate, methylethyl(methacryloyloxymethyl)phosphonate, methylethyl(acryloyloxymethyl)phosphonate, dimethyl(methacryloyloxyethyl)phosphonate, diethyl(methacryloyloxymethyl)phosphonate, diethyl(acryloyloxymethyl)phosphonate, diethyl(methacryloyloxyethyl)phosphonate, dipropyl(methacryloyloxymethyl)phosphonate, dipropyl(methacryloyloxyethyl)phosphonate, and the like, and combinations thereof.

The (b2) aromatic and/or cycloaliphatic (meth)acrylate may have an index of refraction of about 1.4950 to about 1.6500, for example about 1.4950 to about 1.5900.

The (b2) aromatic and/or cycloaliphatic (meth)acrylate may have a weight average molecular weight from about 3,000 g/mol to about 50,000 g/mol.

Examples of the (b2) aromatic and/or cycloaliphatic (meth)acrylate may include without limitation cyclohexyl (meth)acrylate, phenoxy (meth)acrylate, 2-ethylphenoxy (meth)acrylate, benzyl (meth)acrylate, phenyl (meth)acrylate, 2-ethylthiophenyl (meth)acrylate, 2-phenylethyl (meth)acrylate, 2-phenylpropyl (meth)acrylate, 3-phenylpropyl (meth)acrylate, 4-phenylbutyl (meth)acrylate, 2-2-methylphenylethyl (meth)acrylate, 2-3-methylphenylethyl (meth)acrylate, 2-4-methylphenylethyl (meth)acrylate, 2-(4-propylphenyl)ethyl (meth)acrylate, 2-(4-(1-methylethyl)phenyl) ethyl (meth)acrylate, 2-(4-methoxyphenyl)ethyl (meth) acrylate, 2-(4-cyclohexylphenyl)ethyl (meth)acrylate, 2-(2-chlorophenyl)ethyl (meth)acrylate, 2-(3-chlorophenyl)ethyl (meth)acrylate, 2-(4-chlorophenyl)ethyl (meth)acrylate, 2-(4-bromophenyl)ethyl (meth)acrylate, 2-(3-phenylphenyl) ethyl (meth)acrylate, 2-(4-benzylphenyl)ethyl (meth)acrylate, and the like, and combinations thereof.

The (b3) reactive unsaturated monomer may be a monofunctional unsaturated monomer, without being limited thereto. Examples of the reactive unsaturated monomer include without limitation acrylic esters, methacrylic esters, unsaturated carboxylic acids, unsaturated carboxylic acid anhydrides, acid anhydrides, unsaturated carboxylic acid esters having hydroxyl groups, unsaturated carboxylic acid amides, and the like and combinations thereof. Examples of the acrylic esters may include without limitation methyl acrylate, ethyl acrylate, propyl acrylate, butyl acrylate, 2-ethylhexyl acrylate, and the like, and combinations thereof. Examples of the methacrylic esters may include without limitation methyl methacrylate, ethyl methacrylate, propyl methacrylate, butyl methacrylate, benzyl methacrylate, and the like, and combinations thereof. Examples of the unsaturated carboxylic acids may include without limitation acrylic acid, methacrylic acid, and the like, and combinations thereof. Examples of the unsaturated carboxylic acid anhydrides may include without limitation maleic anhydride. Examples of the unsaturated carboxylic acid esters having hydroxyl groups may include without limitation 2-hydroxyethyl acrylate, 2-hydroxypropyl acrylate, monoglycerol acrylate, and the like, and combinations thereof. Examples of the unsaturated carboxylic acid amides may include without limitation acrylic amide, methacrylic amide, and the like and combinations thereof.

The (meth)acrylic flame retardant copolymer may be a copolymer prepared by polymerizing about 1 wt % to about 50 wt % of the phosphorus-based (meth)acrylic monomer, about 1 wt % to about 99 wt % of the aromatic and/or cycloaliphatic (meth)acrylate, and about 0 wt % to about 98 wt % of the reactive unsaturated monomer, wherein each amount is based on the total weight (100 wt %) of the (meth) acrylic flame retardant copolymer. For example, the (meth) acrylic flame retardant copolymer may be a copolymer prepared by copolymerizing about 1 wt % to about 50 wt % of the phosphorus-based (meth)acrylic monomer, about 1 wt % to about 50 wt % of the aromatic and/or cycloaliphatic (meth) acrylate, and about 0 wt % to about 98 wt % of the reactive unsaturated monomer. Further, the (meth)acrylic flame retardant copolymer may be a copolymer prepared by copolymerizing about 5 wt % to about 50 wt % of the phosphorus-based (meth)acrylic monomer, about 15 wt % to about 40 wt % of the aromatic and/or cycloaliphatic (meth)acrylate, and about 10 wt % to about 80 wt % of the reactive unsaturated monomer. As another example, the (meth)acrylic flame retardant copolymer may include the phosphorus-based (meth)acrylic monomer in an amount of about 5 wt % to about 40 wt %, the aromatic and/or cycloaliphatic (meth)acrylate in an amount of about 25 wt % to about 30 wt %, and the reactive unsaturated monomer in an amount of about 35 wt % to about 65 wt %.

In some embodiments, the (meth)acrylic flame retardant copolymer may include the phosphorus-based (meth)acrylic monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % based on the total weight (100 wt %) of the (meth)acrylic flame retardant copolymer. Further, according to some embodiments of the present invention, the amount of the phosphorus-based (meth)acrylic monomer can be in a range from about any of the foregoing amounts to about any other of the foregoing amounts.

In some embodiments, the (meth)acrylic flame retardant copolymer may include the aromatic and/or cycloaliphatic (meth)acrylate in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt % based on the total weight (100 wt %) of the (meth)acrylic flame retardant copolymer. Further, according to some embodiments of the present invention, the amount of the aromatic and/or cycloaliphatic (meth)acrylate can be in a range from about any of the foregoing amounts to about any other of the foregoing amounts.

In some embodiments, the (meth)acrylic flame retardant copolymer may include the reactive unsaturated monomer in an amount of 0 (the reactive unsaturated monomer is not present), about 0 (the reactive unsaturated monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 wt % based on the total weight (100 wt %) of the (meth)acrylic flame retardant copolymer. Further, according to some embodiments of the present invention, the amount of the reactive unsaturated monomer can be in a range from about any of the foregoing amounts to about any other of the foregoing amounts.

As used herein, the term "about 0 wt %" includes embodiments in which the copolymer does not include the reactive unsaturated monomer (i.e., the reactive unsaturated monomer is not present) and also embodiments in which the copolymer does include the reactive unsaturated monomer (i.e., the reactive unsaturated monomer is present).

The (meth)acrylic flame retardant copolymer may have a weight average molecular weight ranging from about 5,000 g/mol to about 500,000 g/mol, for example about 5,000 g/mol to about 150,000 g/mol. When the (meth)acrylic flame retardant copolymer has a weight average molecular weight within this range, the resin composition can maintain flame retardancy and can have improved scratch resistance while maintaining flowability and transparency.

The (meth)acrylic flame retardant copolymer may have an index of refraction of about 1.490 to about 1.590.

The polycarbonate resin composition may include the (meth)acrylic flame retardant copolymer in an amount of about 1 part by weight to about 50 parts by weight based, for example about 5 parts by weight to about 40 parts by weight, as another example about 5 parts by weight to about 30 parts by weight, and as yet another example about 5 parts by weight to about 25 parts by weight, based on about 100 parts by weight of the polycarbonate resin composition. In some embodiments, the polycarbonate resin composition may include the (meth)acrylic flame retardant copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the (meth)acrylic flame retardant copolymer can be in a range from about any of the foregoing amounts to about any other of the foregoing amounts.

When the polycarbonate resin composition includes the (meth)acrylic flame retardant copolymer in an amount within this range, the resin composition may have improved flame retardancy and can prevent significantly reduction in impact resistance and mechanical properties.

(C) (Meth)Acrylic Copolymer Having Index of Refraction of 1.495 to 1.590

The (meth)acrylic copolymer may be a copolymer prepared by copolymerizing an aromatic and/or cycloaliphatic (meth)acrylate represented by Formula 2 and/or 3; and a reactive unsaturated monomer:

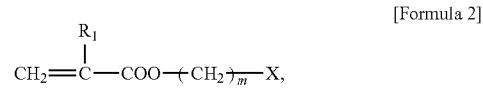

[Formula 2]

wherein $R_1$ is —H or —$(CH_2)$n-$CH_3$, n is an integer from 0 to 5, m is an integer from 0 to 10, and X is cyclohexyl, phenyl, methylphenyl, methylethylphenyl, methoxyphenyl, propylphenyl, cyclohexylphenyl, chlorophenyl, bromophenyl, phenylphenyl or benzylphenyl.

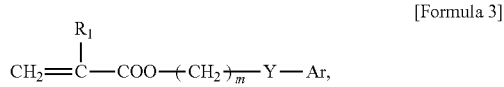

[Formula 3]

wherein $R_1$ is —H or —$(CH_2)$n-$CH_3$, n is an integer from 0 to 5, m is an integer from 0 to 10, Y is an oxygen or a sulfur, and Ar is cyclohexyl, phenyl, methylphenyl, methylethylphenyl, methoxyphenyl, cyclohexylphenyl, chlorophenyl, bromophenyl, phenylphenyl or benzylphenyl.

The aromatic and/or cycloaliphatic (meth)acrylate and reactive unsaturated monomer are as set forth in the (meth)acrylic flame retardant copolymer.

The polycarbonate resin composition may include the (meth)acrylic copolymer in an amount of about 1 part by weight to about 40 parts by weight, for example about 5 parts by weight to about 25 parts by weight, based on about 100 parts by weight of the polycarbonate resin composition. In some embodiments, the polycarbonate resin composition may include the (meth)acrylic copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the (meth)acrylic copolymer can be in a range from about any of the foregoing amounts to about any other of the foregoing amounts.

When the polycarbonate resin composition includes the (meth)acrylic copolymer in an amount within this range, the resin composition may have improved scratch resistance and can prevent deterioration of physical properties.

The (meth)acrylic copolymer may have an index of refraction of about 1.495 to about 1.590.

The (meth)acrylic copolymer may have a weight average molecular weight of about 3,000 g/mol to about 50,000 g/mol. When the (meth)acrylic copolymer has a weight average molecular weight within this range, the properties of the (meth)acrylic copolymer may be maintained and compatibility can be enhanced.

In some embodiments, the polycarbonate resin composition may include about 10 wt % to about 98 wt % of the (A) polycarbonate resin, about 1 wt % to about 50 wt % of the (B) (meth)acrylic flame retardant copolymer, and about 1 wt % to about 40 wt % of the (C) (meth)acrylic copolymer.

According to the present invention, the polycarbonate resin composition may further include (D) a rubber-modified vinyl graft copolymer resin, and/or (E) a phosphorus-based flame retardant.

(D) Rubber-Modified Vinyl Craft Copolymer

The rubber-modified vinyl graft copolymer may have a core-shell structure wherein an unsaturated monomer is grafted onto a core rubber to form a shell, and may serve as an impact modifier in the resin composition.

The core rubber may include at least one rubber. Examples of the rubbers may include without limitation $C_4$-$C_6$ diene rubbers, (meth)acrylate rubbers, silicone rubbers, and the like, and combinations thereof. The rubber may have increased structural stability of the resin composition by including a silicone rubber alone, or a silicone rubber in combination with a (meth)acrylate rubber.

Examples of the (meth)acrylate rubber may include without limitation (meth)acrylate monomers including methyl (meth)acrylate, ethyl (meth)acrylate, n-propyl (meth)acrylate, n-butyl (meth)acrylate, 2-ethylhexyl (meth)acrylate, hexyl (meth)acrylate, and the like, and combinations thereof. When polymerizing the (meth)acrylate rubber, a further curing agent such as but not limitation ethylene glycol di(meth)acrylate, propylene glycol di(meth)acrylate, 1,3-butylene glycol di(meth)acrylate, 1,4-butylene glycol di(meth)acrylate, allyl(meth)acrylate, triallyl cyanurate, and the like, and combinations thereof may be used.

The silicone rubber may include a rubber produced from cyclosiloxane. Examples of cyclosiloxanes may include without limitation hexamethyl cyclotrisiloxane, octamethyl cyclotetrasiloxane, decamethyl cyclopentasiloxane, dodecamethyl cyclohexasiloxane, trimethyltriphenyl cyclopentasiloxane, tetramethyltetraphenyl cyclotetrasiloxane, octaphenyl cyclotetrasiloxane, and the like, and combinations thereof. A further curing agent such as but not limitation trimethoxymethylsilane, triethoxyphenylsilane, tetramethoxysilane, tetraethoxysilane, and the like, and combinations thereof may be used.

The rubber-modified vinyl graft copolymer may include the rubber in an amount of about 50 parts by weight to about 90 parts by weight, based on about 100 parts by weight of the rubber-modified vinyl graft copolymer. In some embodiments, the rubber-modified vinyl graft copolymer may include the rubber in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 parts by weight. Further, according to some embodiments of the present invention, the amount of the rubber can be in a range from about any of the foregoing amounts to about any other of the foregoing amounts.

When the rubber-modified vinyl graft copolymer includes the rubber in an amount within this range, the rubber can have improved resin compatibility, thereby providing excellent impact modifying effects.

The rubber may have an average diameter of 0.4 µm to 1.0 µm. In some embodiments, the rubber may have an average diameter of about 0.4, 0.5, 0.6, 0.7, 0.8, 0.9, or 1.0 µm. Further, according to some embodiments of the present invention, the rubber can have an average diameter be in a range from about any of the foregoing amounts to about any other of the foregoing amounts.

When the rubber has an average diameter within this range, the resin composition can maintain impact resistance and allows color of a molded article to be exhibited well.

Examples of the unsaturated monomer may include without limitation alkyl (meth)acrylates, (meth)acrylates, acid anhydrides, C1-C10 alkyl and/or phenyl-nuclear substituted maleimides, and the like, and combinations thereof.

Examples of the alkyl (meth)acrylate may include without limitation methyl (meth)acrylate, ethyl (meth)acrylate, propyl (meth)acrylate, and the like, and combinations thereof. The alkyl (meth)acrylate may be methyl (meth)acrylate.

Examples of the acid anhydride may include without limitation carboxylic acid anhydrides such as but not limited to maleic anhydride, itaconic anhydride, and the like, and combinations thereof.

The rubber-modified vinyl graft copolymer may include the unsaturated monomer in an amount of about 50 parts by weight or less, for example about 10 parts by weight to about 50 parts by weight, based on about 100 parts by weight of the rubber-modified vinyl graft copolymer. In some embodiments, the rubber-modified vinyl graft copolymer may include the unsaturated monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the unsaturated monomer can be in a range from about any of the foregoing amounts to about any other of the foregoing amounts.

When the rubber-modified vinyl graft copolymer includes the unsaturated monomer in an amount within this range, the compatibility can be maintained without deterioration, thereby demonstrating excellent impact modifying effects.

The polycarbonate resin composition may include the rubber-modified vinyl graft copolymer in an amount of about 0 part by weight to about 30 parts by weight, for example about 3 parts by weight to about 30 parts by weight, and as another example about 3 parts by weight to about 10 parts by weight, based on about 100 parts by weight of the polycarbonate resin composition. In some embodiments, the polycarbonate resin composition may include the rubber-modified vinyl graft copolymer in an amount of 0 (the rubber-modified vinyl graft copolymer is not present), about 0 (the rubber-modified vinyl graft copolymer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the rubber-modified vinyl graft copolymer can be in a range from about any of the foregoing amounts to about any other of the foregoing amounts.

When the rubber-modified vinyl graft copolymer is present in an amount within the above range, for example about 3 parts by weight to about 30 parts by weight, the composition can exhibit impact modifying effects and can have improved mechanical properties such as tensile strength, flexural strength, flexural modulus, and the like.

(E) Phosphorus-Based Flame Retardant

The phosphorus-based flame retardant may be added to provide flame retardancy to the resin composition and may be any of those known in the art, such as but not limited to red phosphorus, phosphonates, phosphinates, and the like, and combinations thereof.

For example, the phosphorus-based flame retardant may be represented by Formula 4:

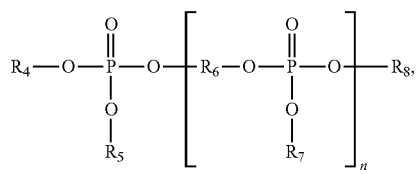

[Formula 4]

wherein $R_4$, $R_5$, $R_7$ and $R_8$ are the same or different and are each independently $C_6$-$C_{20}$ aryl or $C_6$-$C_{20}$ aryl substituted with at least one $C_1$-$C_{20}$ alkyl, $R_6$ is a moiety derived from resorcinol, hydroquinol, bisphenol A or bisphenol S as a dialcohol, and n is an integer from 0 to 10.

In some embodiments, when n=0, examples of the phosphorus-based flame retardant may include without limitation triphenyl phosphate, tricresyl phosphate, cresyl diphenyl phosphate, trixylyl phosphate, tri(2,4,6-trimethylphenyl) phosphate, tri(2,4-di-tert-butylphenyl)phosphate, tri(2,6-di-tert-butylphenyl)phosphate, and the like, and combinations thereof. In other embodiments, when n=1, examples of the phosphorus-based flame retardant may include without limitation resorcinol bis(diphenyl phosphate), hydroquinol bis(diphenyl phosphate), bisphenol A-bis(diphenyl phosphate), resorcinol bis(2,6-di-tert-butylphenyl phosphate), hydroquinol bis(2,6-dimethylphenyl phosphate), and the like, and combinations thereof. In other embodiments, when n=2, the phosphorus-based flame retardant may be present in the form of an oligomeric mixture.

Alternatively, or in addition to, the phosphorus-based flame retardant may be represented by Formula 5:

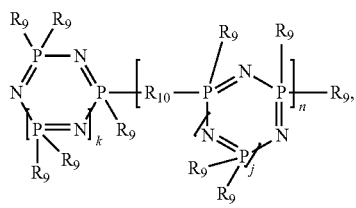

[Formula 5]

wherein each $R_9$ is the same or different and are independently $C_1$-$C_{20}$ alkyl, $C_6$-$C_{20}$ aryl, $C_6$-$C_{20}$ aryl substituted with $C_1$-$C_{20}$ alkyl, $C_6$-$C_{20}$ aralkyl, $C_1$-$C_{20}$ alkoxy, $C_6$-$C_{20}$ aryloxy, amino groups or hydroxyl group, k and j are the same or different and are each independently an integer from 0 to 10, the $C_1$-$C_{20}$ alkoxy or $C_6$-$C_{20}$ aryloxy may be optionally substituted with at least one $C_1$-$C_{20}$ alkyl, $C_6$-$C_{20}$ aryl, amino group or hydroxyl group, $R_{10}$ is a moiety derived from $C_6$-$C_{20}$ dioxyaryl or $C_6$-$C_{20}$ dioxyaryl substituted with $C_1$-$C_{20}$ alkyl, and n representing the number-average degree of polymerization is an average of 0.3 to 3.

The polycarbonate resin composition may include the phosphorus-based flame retardant in an amount of about 0 to about 30 parts by weight, for example about 3 parts by weight to about 30 parts by weight, based on about 100 parts by weight of the polycarbonate resin composition. In some embodiments, the polycarbonate resin composition may include the phosphorus-based flame retardant in an amount of 0 (the phosphorus-based flame retardant is not present), about 0 (the phosphorus-based flame retardant is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the phosphorus-based flame retardant can be in a range from about any of the foregoing amounts to about any other of the foregoing amounts.

When the polycarbonate resin composition includes the phosphorus-based flame retardant in an amount within this range, the flame retardancy can be increased without significant deterioration in mechanical properties.

The resin composition of the present invention may further include one or more additives. Examples of the additives may include without limitation flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, fire-proofing agents, and the like and mixtures thereof.

The resin composition of the present invention may be prepared by any method known in the art. For example, the components of the present invention and other additives can be mixed simultaneously, subjected to melt extrusion in an extruder to yield pellets and then the resulting pellets can be molded to form injection and compression molded articles.

The resin composition of the present invention may have a flame retardancy of V2 or more, as measured on a 3.2 mm thick specimen in accordance with UL94, and a scratch resistance width of from about 180 μm to about 340 μm, as measured on a 2.5 mm thick specimen in accordance with Ball-type Scratch Profile (BSP) test. Further, the resin composition of the present invention may have a degree of heat resistance (Vicat Softening Temperature: VST) of about 80° C. or more, as measured on a 3.2 mm thick specimen under a load of 5 kg in accordance with ASTM D1525.

The present invention provides a molded article prepared from the polycarbonate resin composition. Examples of molding methods include extrusion, injection molding or casting and the like, without being limited thereto. These molding methods are well known to those skilled in the art.

The molded articles may be broadly applied as exterior materials of various electric and electronic components, parts and automobile components, lenses, window glass and the like. For example, examples of the molded articles may include without limitation housings for electric or electronic home appliances, such as televisions, stereo systems, washing machines, cassette players, MP3 players, telephones, game consoles, video players, computers, photocopiers, and the like, and interior/exterior materials of automobiles, such as dashboards of automobiles, instrument panels, door panels, quarter panels, wheel covers, and the like.

Next, the present invention will be better appreciated from the following examples and comparative examples. It should be understood that these examples are provided for illustration only and are not to be construed in any way as limiting the scope of the present invention.

Descriptions of details apparent to those skilled in the art will be omitted.

EXAMPLES

Preparation Examples and Materials (A) Polycarbonate Resin

PANLITE L-1250WP which has a weight average molecular weight of 25,000 g/mol and is a bisphenol A linear polycarbonate resin produced by TEIJIN in Japan is used as a polycarbonate resin.

(B) (Meth)Acrylic Flame Retardant Copolymer (B1) (Meth)Acrylic Flame Retardant Copolymer-1

A copolymer (weight average molecular weight 25,000 g/mol) prepared by suspension polymerization of 30 wt % of diethyl (methacryloyloxymethyl)phosphonate, 30 wt % of phenyl methacrylate monomer and 40 wt % of methyl methacrylate monomer is used.

(B2) (Meth)Acrylic Flame Retardant Copolymer-2

A copolymer (weight average molecular weight 35,000 g/mol) prepared by suspension polymerization of 30 wt % of diethyl (methacryloyloxymethyl)phosphonate, 30 wt % of phenyl methacrylate monomer and 40 wt % of methyl methacrylate monomer is used.

(B3) (Meth)Acrylic Flame Retardant Copolymer-3

A copolymer (weight average molecular weight 140,000 g/mol) prepared by suspension polymerization of 30 wt % of diethyl (methacryloyloxymethyl)phosphonate, 30 wt % of phenyl methacrylate monomer and 40 wt % of methyl methacrylate monomer is used.

(B4) (Meth)Acrylic Flame Retardant Copolymer-4

A copolymer (weight average molecular weight 25,000 g/mol) prepared by suspension polymerization of 10 wt % of diethyl (methacryloyloxymethyl)phosphonate, 30 wt % of phenyl methacrylate monomer and 60 wt % of methyl methacrylate monomer is used.

(B5) (Meth)Acrylic Flame Retardant Copolymer-5

A copolymer (weight average molecular weight 35,000 g/mol) prepared by suspension polymerization of 10 wt % of diethyl (methacryloyloxymethyl)phosphonate, 30 wt % of phenyl methacrylate monomer and 60 wt % of methyl methacrylate monomer is used.

(B6) (Meth)Acrylic Flame Retardant Copolymer-6

A copolymer (weight average molecular weight 125,000 g/mol) prepared by suspension polymerization of 10 wt % of diethyl (methacryloyloxymethyl)phosphonate, 30 wt % of phenyl methacrylate monomer and 60 wt % of methyl methacrylate monomer is used.

(C) (Meth)Acrylic Copolymer Having an Index of Refraction of 1.495 to 1.590

(C1) (Meth)Acrylic Copolymer-1 Having an Index of Refraction of 1.495 to 1.590

A copolymer (index of refraction: 1.530, weight average molecular weight: 35,000 g/mol) prepared by suspension polymerization of 30 wt % of phenyl methacrylate monomer and 70 wt % of methyl methacrylate monomer is used.

(C2) (Meth)Acrylic Copolymer-2 Having an Index of Refraction of 1.495 to 1.590

A copolymer (index of refraction: 1.530, weight average molecular weight: 25,000 g/mol) prepared by suspension polymerization of 30 wt % of phenyl methacrylate monomer and 70 wt % of methyl methacrylate monomer is used.

(D) Rubber-Modified Vinyl Graft Copolymer

METABLEN C-930A (MITSUBISHI RAYON) in which methyl methacrylate monomer is grafted to a butadiene/acrylic rubber complex is used.

(E) Phosphorus-Based Flame Retardant

Resorcinol-bis(diphenylphosphate) is used.

Examples 1-10

The components are mixed in an amount as listed in Table 1. To the mixture, 0.1 parts by weight of octadecyl 3-(3,5-di-tert-butyl-4-hydroxyphenyl)propionate is added, followed by melting, kneading and extrusion to yield pellets. A twin-screw extruder having a diameter of 45 mm and L/D=29 is used for extrusion. The prepared pellets are dried at 80° C. for 6 hours and injection-molded in a 6 oz injection molding machine to prepare specimens.

Comparative Examples 1-7

Specimens are prepared in the same manner as in the inventive examples except that the content of each component is changed as shown in Table 1. In Table 1, (F) refers to an (meth)acrylic resin and represents LB4 (LG MMA) which is a polymethyl methacrylate resin (weight average molecular weight: 92,000 g/mol).

Flow mark, transparency, total light transmittance (TT), heat resistance, melt-flow index (MI), flame retardancy and scratch resistance of the specimens prepared in the examples and the comparative examples are evaluated as follows. Results are shown in Table 1.

Evaluation Method

Flow mark: The presence of flow mark is evaluated using specimens having a size of L90 mm×W50 mm×t2.5 mm with the naked eye. The flow mark is a standard for evaluating improved compatibility of the resin composition.

Transparency and Total light transmittance (TT) (%): Total light transmittance (TT) of each 2.5 mm thick specimen is measured using a Hazemeter NDH 2000 (Nippon Denshoku Co. Ltd.) in accordance with ASTM D1003. The total light transmittance is calculated from the total sum of diffuse light transmittance (DF) and parallel light transmittance (PT). A higher total light transmittance (TT) is evaluated as higher transparency.

Heat resistance (° C.): Vicat softening temperature (VST) is measured under a load of 5 kg in accordance with ASTM D1525.

Melt-flow index (g/10 min): Melt-flow index (MI) is measured at 250° C. under a load of 5 kg in accordance with ASTM D1238.

Flame retardancy: Flame retardancy is measured on a 3.2 mm thick specimen in accordance with UL 94 vertical test method and evaluated as V2 or fail.

Scratch resistance (BSP width, μm): Scratch resistance is measured on a 2.5 mm thick specimen in accordance with the Ball-type Scratch Profile (BSP) test.

The BSP test is conducted by applying a 10 to 20 mm long scratch to a surface of a resin specimen under certain load and speed, and measuring a profile of the applied scratch through a surface profile analyzer. The scratch resistance is evaluated from scratch width, scratch depth, scratch range, and scratch area. The surface profile analyzer measuring the scratch profile may be of a contact type or a non-contact type. In the case of the contact type, the surface profile analyzer may provide a scratch profile through surface scanning using a metal stylus tip having a diameter of 1~2 μm. In the case of the non-contact type, the surface profile analyzer may include optical spectrometers such as a three-dimensional microscope and AFM. Scratch width (μm), scratch depth, scratch range, and scratch area, which are measures of scratch resistance, are determined from the measured scratch profile. As the measured scratch width, scratch depth and scratch range, and scratch area decrease, scratch resistance increases. The scratch width, scratch depth and scratch range are represented in μm and the scratch area is represented in $μm^2$. In the present BSP test, a contact type surface profile analyzer (XP-1) from Ambios Corporation is used wherein the tip of a metal stylus has a diameter of 2 μm. The load applied upon measuring the scratch resistance is 1,000 g, the scratch speed was 75 mm/min, and the metal tip causing a scratch is a metal spherical tip having a diameter of 0.7 mm. Scratch width (μm) is measured using a specimen having a size of L90 mm×W50 mm×t2.5 mm.

In Comparative Examples 5-7, the resins have flame retardancy by adding a specific amount or more of a conventional phosphorus-based flame retardant into polycarbonate resin compositions having improved scratch resistance and compatibility. However, due to the content of the flame retardant, the resins have reduced heat resistance and scratch resistance. In contrast, the resin compositions of the present invention have heat resistance and scratch resistance while maintaining flame retardancy (see Examples 1-10).

In addition, the resin compositions of the present invention including the rubber-modified vinyl graft copolymer resin or phosphorus-based flame retardant maintain a flame retardancy of V2 or more together with heat resistance and scratch resistance (see Example 9 and Comparative Example 5, Example 10 and Comparative Example 6).

TABLE 1

| Component | Example 1 | 2 | 3 | 4 | 5 | 6 | 7 | 8 | 9 | 10 | Comparative Example 1 | 2 | 3 | 4 | 5 | 6 | 7 |
|---|---|---|---|---|---|---|---|---|---|---|---|---|---|---|---|---|---|
| (A) | 70 | 70 | 70 | 70 | 70 | 70 | 70 | 70 | 70 | 70 | 100 | 70 | 70 | 70 | 70 | 70 | 70 |
| (B1) | 5 | — | — | 10 | — | — | — | — | — | — | — | — | — | — | — | — | — |
| (B2) | — | 5 | — | — | — | — | — | — | — | — | — | — | — | — | — | — | — |
| (B3) | — | — | 5 | — | — | — | — | — | — | — | — | — | — | — | — | — | — |
| (B4) | — | — | — | — | 15 | — | — | 15 | 15 | 15 | — | — | — | — | — | — | — |
| (B5) | — | — | — | — | — | 15 | — | — | — | — | — | — | — | — | — | — | — |
| (B6) | — | — | — | — | — | — | 15 | — | — | — | — | — | — | — | — | — | — |
| (C1) | — | — | — | — | — | — | — | — | — | — | — | — | 30 | — | — | — | — |
| (C2) | 25 | 25 | 25 | 20 | 15 | 15 | 15 | 15 | 15 | 15 | — | — | — | 30 | 30 | 30 | 30 |
| (D) | — | — | — | — | — | — | — | — | 5 | 5 | — | — | — | — | 5 | 5 | 5 |
| (E) | — | — | — | — | — | — | — | 5 | — | 5 | — | — | — | — | — | 5 | 20 |
| (F) | — | — | — | — | — | — | — | — | — | — | — | 30 | — | — | — | — | — |
| Flow mark | None | None | Yes | None | None | None | None | None | None | None | None | Yes | None | None | None | None | None |
| Transparency | TL | TL | TL | OP | T | TL | OP | T | OP | OP | T | OP | T | T | OP | OP | OP |
| Total light transmittance (%) | 57.2 | 40.0 | 39.2 | 29.9 | 82.3 | 50.2 | 23.5 | 81.7 | 34.9 | 34.1 | 88.5 | 12.1 | 70.1 | 87.9 | 39.1 | 38.2 | 34.4 |
| Heat resistance (° C.) | 122.2 | 121.9 | 121.7 | 120.9 | 125.0 | 125.5 | 126.1 | 118.5 | 123.8 | 117.1 | 145.4 | 133.1 | 126.6 | 126.0 | 123.3 | 118.3 | 93.7 |
| MI (g/10 min) | 47.3 | 41.4 | 36.0 | 38.4 | 38.3 | 36.2 | 26.1 | 45.2 | 29.5 | 37.3 | 6.3 | 6.1 | 13.7 | 35.9 | 28.0 | 33.1 | 42.2 |
| Flame retardancy | V2 | V2 | V2 | V2 | V2 | V2 | V2 | V2 | V2 | V2 | V2 | fail | fail | fail | fail | fail | V2 |
| BSP width (μm) | 246 | 246 | 239 | 239 | 279 | 254 | 276 | 281 | 285 | 283 | 332 | 262 | 257 | 242 | 250 | 272 | 285 |

(A), (B1) to (B6), (C1) to (C2), (D), (E) and (F) are represented as parts by weight. In transparency, T represents transparent, TL represents translucent, and OP represents opaque.

As shown in Table 1, when comparing the resin compositions of the present invention with resins including a polycarbonate alone, the resin compositions of the present invention exhibit improved scratch resistance together with flame retardancy (see Examples 1-7 and Comparative Example 1). In addition, the resin compositions of the present invention exhibit high flame retardancy and scratch resistance, as compared with resins including a polycarbonate and a conventional high molecular weight polymethyl methacrylate (weight average molecular weight: 30,000 g/mol or more). Specifically, the resin compositions of the present invention did not show any flow mark, and thus demonstrate improved compatibility and transparency (see Examples 1-7 and Comparative Example 2). Furthermore, the resin compositions including (meth)acrylic flame retardant copolymers of the present invention exhibit a flame retardancy of V2 or more while maintaining heat resistance and scratch resistance, as compared with resins including a polycarbonate and an acrylic copolymer having high index of refraction (index of refraction is 1.495-1.590 and weight average molecular weight is 25,000-35,000 g/mol) (see Examples 1-7 and Comparative Examples 3-4).

Furthermore, in the case of adding a flame retardant to enhance flame retardancy, the resin compositions of the present invention maintain heat resistance together with flame retardancy (see Example 10 and Comparative Examples 6-7). Furthermore, the resin compositions of the present invention maintain flame retardancy with a small amount of flame retardant, rendering the resin compositions environmentally friendly (see Example 10 and Comparative Example 7).

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A polycarbonate resin composition comprising:
   (A) a polycarbonate resin;
   (B) a (meth)acrylic flame retardant copolymer; and
   (C) a (meth)acrylic copolymer having an index of refraction of about 1.495 to about 1.590,
   wherein the (B) (meth)acrylic flame retardant copolymer comprises: (b1) a phosphorus-based (meth)acrylic monomer represented by Formula 1; (b2) an aromatic (meth)acrylate and/or cycloaliphatic (meth)acrylate represented by Formula 2 and/or 3; and (b3) a reactive unsaturated monomer:

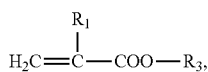

[Formula 1]

wherein $R_1$ is —H or —$(CH_2)n$-$CH_3$, n is an integer from 0 to 5, and $R_3$ is

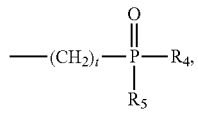

wherein t is an integer from 1 to 10, $R_4$ and $R_5$ are the same or different and are each independently —$O(CH_2)qX$, q is an integer from 0 to 3, and X is methyl, cyclohexyl, phenyl, methylphenyl, methylethylphenyl, propylphenyl, methoxyphenyl, cyclohexylphenyl, chlorophenyl, bromophenyl, phenylphenyl or benzylphenyl,

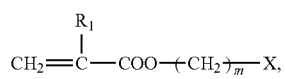

[Formula 2]

wherein $R_1$ is —H or —$(CH_2)n$-$CH_3$, n is an integer from 0 to 5, m is an integer from 0 to 10, and X is cyclohexyl, phenyl, methylphenyl, methylethylphenyl, methoxyphenyl, propylphenyl, cyclohexylphenyl, chlorophenyl, bromophenyl, phenylphenyl or benzylphenyl,

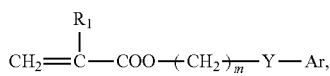

[Formula 3]

wherein $R_1$ is —H or —$(CH_2)n$-$CH_3$, n is an integer from 0 to 5, m is an integer from 0 to 10, Y is oxygen or sulfur, and Ar is cyclohexyl, phenyl, methylphenyl, methylethylphenyl, methoxyphenyl, cyclohexylphenyl, chlorophenyl, bromophenyl, phenylphenyl or benzylphenyl.

2. The polycarbonate resin composition according to claim 1, wherein the (B) (meth)acrylic flame retardant copolymer comprises about 1 wt % to about 50 wt % of the (b1) phosphorus-based (meth)acrylic monomer, about 1 wt % to about 99 wt % of the (b2) aromatic and/or cycloaliphatic (meth)acrylate, and greater than 0 wt % to about 98 wt % of the (b3) reactive unsaturated monomer.

3. The polycarbonate resin composition according to claim 1, wherein the (B) (meth)acrylic flame retardant copolymer has a weight average molecular weight of about 5,000 g/mol to about 500,000 g/mol.

4. The polycarbonate resin composition according to claim 1, wherein the (B) (meth)acrylic flame retardant copolymer is present in an amount of about 1 part by weight to about 50 parts by weight based on about 100 parts by weight of the polycarbonate resin composition.

5. The polycarbonate resin composition according to claim 1, wherein the (A) polycarbonate resin is present in an amount of about 10 parts by weight to about 98 parts by weight based on about 100 parts by weight of the polycarbonate resin composition.

6. The polycarbonate resin composition according to claim 1, wherein the (C) (meth)acrylic copolymer having an index of refraction of about 1.495 to about 1.590 is present in an amount of about 1 part by weight to about 40 parts by weight based on about parts by weight of the polycarbonate resin composition.

7. The polycarbonate resin composition according to claim 1, wherein the (C) (meth)acrylic copolymer having an index of refraction of about 1.495 to about 1.590 has a weight average molecular weight of about 3,000 g/mol to about 50,000 g/mol.

8. The polycarbonate resin composition according to claim 1, wherein the polycarbonate resin composition comprises about 10 wt % to about 98 wt % of the (A) polycarbonate resin; about 1 wt % to about 50 wt % of the (B) (meth)acrylic flame retardant copolymer; and about 1 wt % to about 40 wt % of the (C) (meth)acrylic copolymer having an index of refraction of about 1.495 to about 1.590.

9. The polycarbonate resin composition according to claim 1, further comprising: (D) a rubber-modified vinyl graft copolymer resin, (E) a phosphorus-based flame retardant, or a combination thereof.

10. The polycarbonate resin composition according to claim 9, wherein the (D) rubber-modified vinyl graft copolymer resin is present in an amount of about 0 parts by weight to about 30 parts by weight based on about 100 parts by weight of the polycarbonate resin composition, and the (E) phosphorus-based flame retardant is present in an amount of about 0 parts by weight to about 30 parts by weight based on about 100 parts by weight of the polycarbonate resin composition.

11. The polycarbonate resin composition according to claim 1, wherein the (C) (meth)acrylic copolymer having an index of refraction of about 1.495 to about 1.590 comprises an aromatic (meth)acrylate and/or cycloaliphatic (meth)acrylate represented by Formula 2 and/or 3; and a reactive unsaturated monomer:

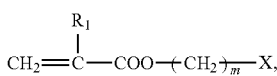

[Formula 2]

wherein $R_1$ is —H or —$(CH_2)n$-$CH_3$, n is an integer from 0 to 5, m is an integer from 0 to 10, and X is cyclohexyl, phenyl, methylphenyl, methylethylphenyl, methoxyphenyl, propylphenyl, cyclohexylphenyl, chlorophenyl, bromophenyl, phenylphenyl or benzylphenyl,

[Formula 3]

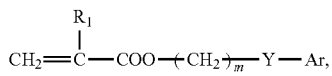

wherein $R_1$ is —H or —$(CH_2)_n$-$CH_3$, n is an integer from 0 to 5, m is an integer from 0 to 10, Y is an oxygen or a sulfur, and Ar is cyclohexyl, phenyl, methylphenyl, methylethylphenyl, methoxyphenyl, cyclohexylphenyl, chlorophenyl, bromophenyl, phenylphenyl or benzylphenyl.

12. The polycarbonate resin composition according to claim 1, wherein the reactive unsaturated monomer comprises a (meth)acrylic ester, unsaturated carboxylic acid, unsaturated carboxylic acid anhydride, acid anhydride, unsaturated carboxylic acid ester having a hydroxyl group, unsaturated carboxylic acid amide or a combination thereof.

13. The polycarbonate resin composition according to claim 1, wherein the polycarbonate resin composition has a flame retardancy of V2 or more, as measured on a 3.2 mm thick specimen in accordance with UL94.

14. The polycarbonate resin composition according to claim 1, wherein the polycarbonate resin composition has a scratch resistance width of from about 180 μm to about 340 μm, as measured on a 2.5 mm thick specimen in accordance with a Ball-type Scratch Profile (BSP) test.

15. The polycarbonate resin composition according to claim 1, wherein the polycarbonate resin composition has a degree of heat resistance (Vicat Softening Temperature: VST) of about 80° C. or more, as measured on a 3.2 mm thick specimen under a load of 5 kg in accordance with ASTM D1525.

16. The polycarbonate resin composition according to claim 1, further comprising: at least one additive selected from the group consisting of flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, fire-proofing agents, and mixtures thereof.

17. A molded article produced from the polycarbonate resin composition according to claim 1.

18. A molded article produced from the polycarbonate resin composition according to claim 9.

* * * * *

UNITED STATES PATENT AND TRADEMARK OFFICE
CERTIFICATE OF CORRECTION

| | | |
|---|---|---|
| PATENT NO. | : 9,127,157 B2 | Page 1 of 1 |
| APPLICATION NO. | : 13/872230 | |
| DATED | : September 8, 2015 | |
| INVENTOR(S) | : Jin Hwa Chung et al. | |

It is certified that error appears in the above-identified patent and that said Letters Patent is hereby corrected as shown below:

In the Specification

Column 9, Line 27 reads: "(D) Rubber-Modified Vinyl Craft Copolymer"
and should read: "(D) Rubber-Modified Vinyl Graft Copolymer"

In the Claims

Column 18, Claim 6, Line 21 reads: "based on about parts by weight of the polycarbonate resin"
and should read: "based on about 100 parts by weight of the polycarbonate resin"

Signed and Sealed this
Tenth Day of May, 2016

Michelle K. Lee
*Director of the United States Patent and Trademark Office*